No. 617,397. Patented Jan. 10, 1899.
O. A. HOYT.
WHEEL WASHING APPARATUS.
(Application filed Nov. 4, 1898.)
(No Model.)

Witnesses:
W. F. Fouse
W. G. Good

Inventor:
Oliver A. Hoyt,
by Humphrey & Humphrey,
Atty's.

UNITED STATES PATENT OFFICE.

OLIVER A. HOYT, OF ROCK CREEK, OHIO.

WHEEL-WASHING APPARATUS.

SPECIFICATION forming part of Letters Patent No. 617,397, dated January 10, 1899.

Application filed November 4, 1898. Serial No. 695,420. (No model.)

*To all whom it may concern:*

Be it known that I, OLIVER A. HOYT, a citizen of the United States, residing at Rock Creek, in the county of Ashtabula and State of Ohio, have invented a certain new and useful Improvement in Wheel-Washing Apparatus, of which the following is a specification.

My invention relates to improvements in apparatus for washing carriage and buggy wheels; and the object of my invention is to provide simple and efficient devices by which all parts of the wheel may be readily and quickly washed by simply revolving the wheel.

To the aforesaid object my invention consists in the peculiar and novel construction, arrangement, and combination of parts hereinafter described, and then specifically pointed out in the claims, reference being had to the accompanying drawings, which form a part of this specification.

Figure 1:
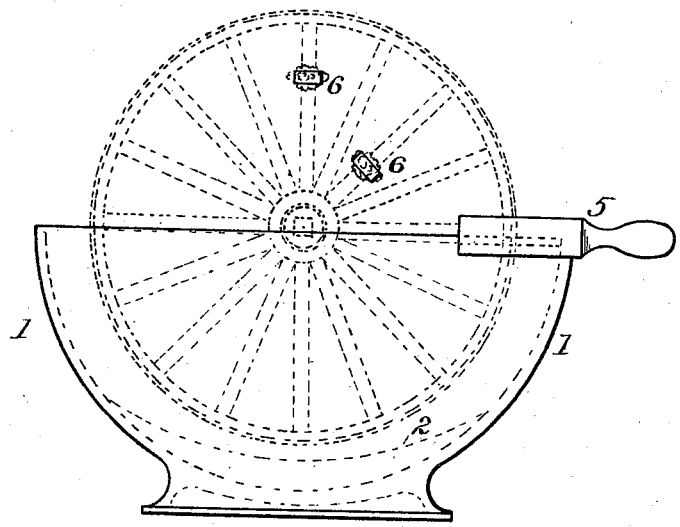
Figure 2:
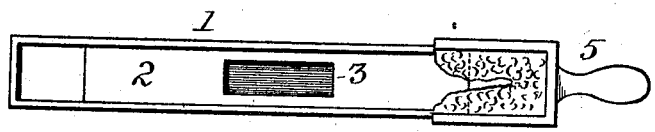
Figure 3:
Figure 4:
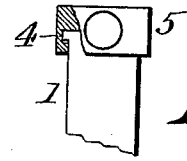

Referring to the drawings, Figure 1 is a side elevation of my apparatus with the wheel shown in dotted lines; Fig. 2, a plan of the same with the wheel omitted; Fig. 3, an end view, enlarged, of one of the spoke-washers; and Fig. 4, an end view of a part of the tank with the felly-washer, a part being shown in section to exhibit its construction.

The tank 1 is semicircular and is provided with a suitable base to rest on the floor or ground. In the bottom of this tank is an inner detachable bottom 2, through which is an opening 3. This false bottom fits inside the tank, but is of greater radius than the tank and rests upon its ends therein. At one end of the tank are beads or fillets 4, on which fits and moves a forked slide 5, provided with a suitable handle and having the inner faces covered with sponge or soft fabric. The spokes are washed by curved bands 6 of spring metal lined and covered with sponge or soft fabric.

In operation the empty tank is tipped endwise and passed under the wheel and brought upright with the lower part of the wheel in it, the axle on which the wheel is mounted being supported by a jack (not shown) and the tank filled with water. A single washing-band 6 is then placed on each spoke and the wheel revolved on its axle. The effect of this is to wet the wheel to the height of the water in the tank and to moisten the adhering dirt and mud, which as the wheel is revolved falls into the tank and passes through the hole 3 in the false bottom 2, where it remains and does not mix with the water. It will be found expedient to revolve the wheel rapidly at first to maintain the bands 6 near the felly by centrifugal force to prevent them from rubbing the mud on the spokes and thereby scratching their finished surface; but after the mud has been rinsed off the wheel is revolved slower, thus permitting these bands to slide along the spokes from end to end by gravitation. The sponge or fabric with which these bands are lined projects from each end, so as to wash about the ends of the spokes where they enter the hub and felly, respectively, while the intermediate part washes the spokes.

When the wheel is first inserted in the tank, the slide 5 is drawn back from contact with the felly until the heavy dirt and mud has fallen off, as hereinbefore stated. It is then pushed inward and washes the body of the felly and again drawn back and the tank removed and the wheel dried by wiping or as desired while still supported with the jack.

I claim as my invention—

1. The combination with a wheel-washing tank of a forked slide arranged to slide on one end thereof to inclose the felly of a wheel therein and having its inner faces covered with a flexible absorbent washing material, substantially as shown and described.

2. An improved spoke-washer to be used with a wheel-washing tank, consisting of a spring-band adapted to inclose the spoke and lined and covered with absorbent washing material extended beyond each end of said band, substantially as shown and described.

In testimony that I claim the above I hereunto set my hand.

OLIVER A. HOYT.

In presence of—
C. P. HUMPHREY,
C. E. HUMPHREY.